(12) United States Patent
Walp et al.

(10) Patent No.: US 8,351,099 B2
(45) Date of Patent: Jan. 8, 2013

(54) HUE SPECIFIC MONOCHROMATIC PRINTING MECHANISM

(75) Inventors: Jason Charles Walp, Louisville, CO (US); James Anthony Chauvin, Frederick, CO (US)

(73) Assignee: InfoPrint Solutions Company LLC, Boulder, CO (US)

( * ) Notice: Subject to any disclaimer, the term of this patent is extended or adjusted under 35 U.S.C. 154(b) by 596 days.

(21) Appl. No.: 12/621,783

(22) Filed: Nov. 19, 2009

(65) Prior Publication Data

US 2011/0119607 A1    May 19, 2011

(51) Int. Cl.
*H04N 1/60* (2006.01)
(52) U.S. Cl. ....................................................... 358/518
(58) Field of Classification Search .......... 358/518–520; 382/167; 345/591, 604
See application file for complete search history.

(56) References Cited

U.S. PATENT DOCUMENTS

| 5,416,890 A * | 5/1995 | Beretta .......................... 345/591 |
| 6,023,527 A * | 2/2000 | Narahara ....................... 382/167 |
| 7,038,810 B1 | 5/2006 | Yamazoe et al. |
| 7,110,595 B2 | 9/2006 | Inoue |
| 7,428,069 B2 | 9/2008 | Fujio et al. |
| 2005/0200868 A1 | 9/2005 | Yoshida |
| 2008/0062443 A1 | 3/2008 | Olson |
| 2008/0094517 A1 | 4/2008 | Takeuchi et al. |
| 2008/0158579 A1 | 7/2008 | Ohga et al. |
| 2009/0066986 A1 | 3/2009 | Miyagi et al. |

FOREIGN PATENT DOCUMENTS

JP    2005311900    11/2005

* cited by examiner

*Primary Examiner* — Scott A Rogers
(74) *Attorney, Agent, or Firm* — Blakely, Sokoloff, Taylor & Zafman LLP

(57) ABSTRACT

A method disclosed. The method includes receiving color pixel data for an object to be printed, receiving predefined color values, calculating color space coordinates corresponding to the predefined color values, performing monochromatic hue mapping to map each pixel to the calculated color space coordinate values and color mapping the pixels from a source color space to a destination color space.

20 Claims, 3 Drawing Sheets

HUE SPECIFIC MONOCHROMATIC PRINTING MECHANISM

FIELD OF THE INVENTION

The invention relates to the field of image processing, and in particular, to color printing systems.

BACKGROUND

Print systems include presentation architectures that are provided for representing documents in a data format that is independent of the methods that are utilized to capture or create those documents. Examples of presentation systems include Portable Document Format (PDF) and PostScript (PS). According to these systems, documents may include mixed content data objects (e.g., combinations of text, image, graphics, etc.).

Further, these print systems perform color printing using a combination of color inks or toners (e.g., cyan (C), magenta (M), yellow (Y) and black (K)). Thus, mixed content input color data objects received at a print system are rendered using all colorants. In some instances, it may be necessary to implement a printer to replicate a monochromatic color of a different printer, ink or imaging technology (e.g., "cool-black" ink, sepia-toned photograph, etc.) in order to achieve a particular artistic effect.

However when printing color images as monochrome (sometimes called black and white), the resulting hue of the image is often unsatisfactory due to the hue of the black colorant. Therefore, it is likely that all colorants are needed to simulate the monochromatic hue of a different printer (type or manufacturer). While it would be possible to design a print job to use a specific monochromatic hue, a corresponding print file must often be used as is. Additionally, the print file may be in a different color space than the output device, thus, providing no control over the mapping to the final mix of colorants.

Accordingly, a mechanism to map incoming image colors to a user specified hue prior to reproducing at an output device is desired.

SUMMARY

In one embodiment, a method includes receiving color pixel data for an object to be printed, receiving predefined color values, calculating color space coordinates corresponding to the predefined color values, performing monochromatic hue mapping to map each pixel to the calculated color space coordinate values and color mapping the pixels from a source color space to a destination color space.

In another embodiment, a printer is disclosed. The printer includes a control unit to receive color pixel data for an object to be printed. The control unit includes a monochromatic hue unit to receive predefined color values, calculate color space coordinates corresponding to the predefined color values and perform monochromatic hue mapping to map each pixel to the calculated color space coordinate values. The control unit also includes a color unit to perform color mapping and determine color values for each pixel in an object to be printed.

BRIEF DESCRIPTION OF THE DRAWINGS

A better understanding of the present invention can be obtained from the following detailed description in conjunction with the following drawings, in which.

DETAILED DESCRIPTION

A monochromatic color mapping mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
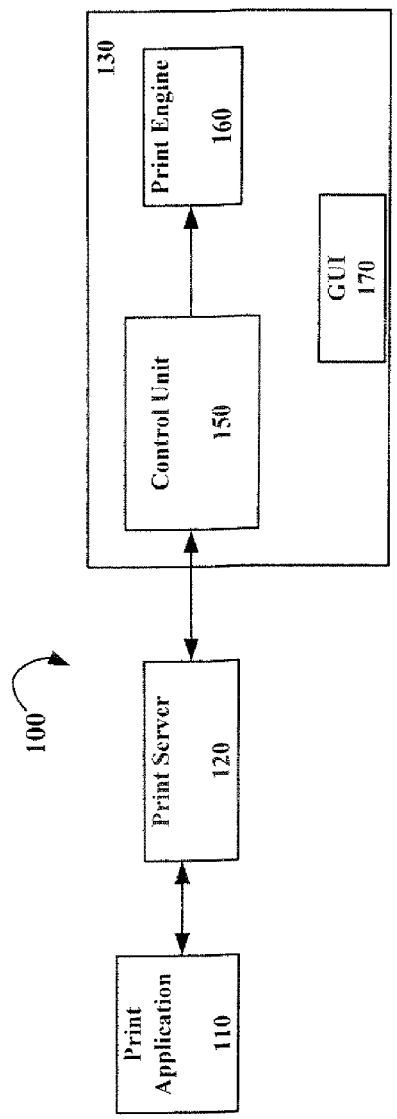
FIG. 1 illustrates one embodiment of a data processing system network.

FIG. 1 illustrates one embodiment of a printing system 100. Printing system 100 includes a print application 110, a server 120 and printer 130. Printer 130 includes a control unit 150 and a print engine 160. Print application 110 makes a request for the printing of a document. In one embodiment, print application 110 provides PostScript (PS) and PDF files for printing to print server 120. However in other embodiments, additional file formats may be provided by print application 110.

Figure 2:
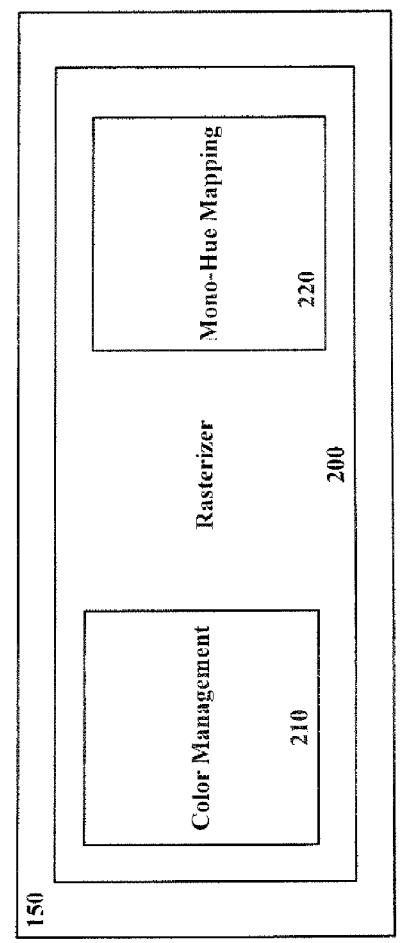
FIG. 2 illustrates one embodiment of a control unit.

According to one embodiment, control unit 150 processes and renders objects received from print server 120 and provides raster maps for printing to print engine 160. FIG. 2 illustrates one embodiment of a control unit 150. Control unit 150 includes a rasterizer 200 having color management unit 210, mono-hue mapping unit 220, as well as other units that will not be described herein.

Rasterizer 200 is implemented to process image objects received at control unit 150 by performing a raster image process (RIP) to convert an image described in a vector graphics format (e.g., shapes) into a raster image (e.g., pixels) for output to print engine 160. Color management unit 210 provides a color mapping from a source to a destination color space.

In such an embodiment, color management unit 210 uses ICC profiles to perform the mapping to determine CMYK values for each pixel in a particular object to be printed at print engine 160. Further, color management unit 210 may convert a print job file received as device input data (e.g., RGB, CMYK, Grayscale, etc.) to a profile connection space (PCS) (e.g., CIELAB (L*a*b*) or CIEXYZ) prior to performing the mapping.

According to one embodiment, mono-hue mapping unit 220 provides color conversion mapping of a print job to a user specified monochromatic hue. Thus, mono-hue mapping unit 220 enables the color conversion of a print job in any color space to an image of a constant desired hue. In one embodiment, mono-hue mapping unit 220 performs the color conversion mapping based on operator selected color values provided via a Graphical User Interface (GUI) 170 at printer 130.

Figures 3, 4:
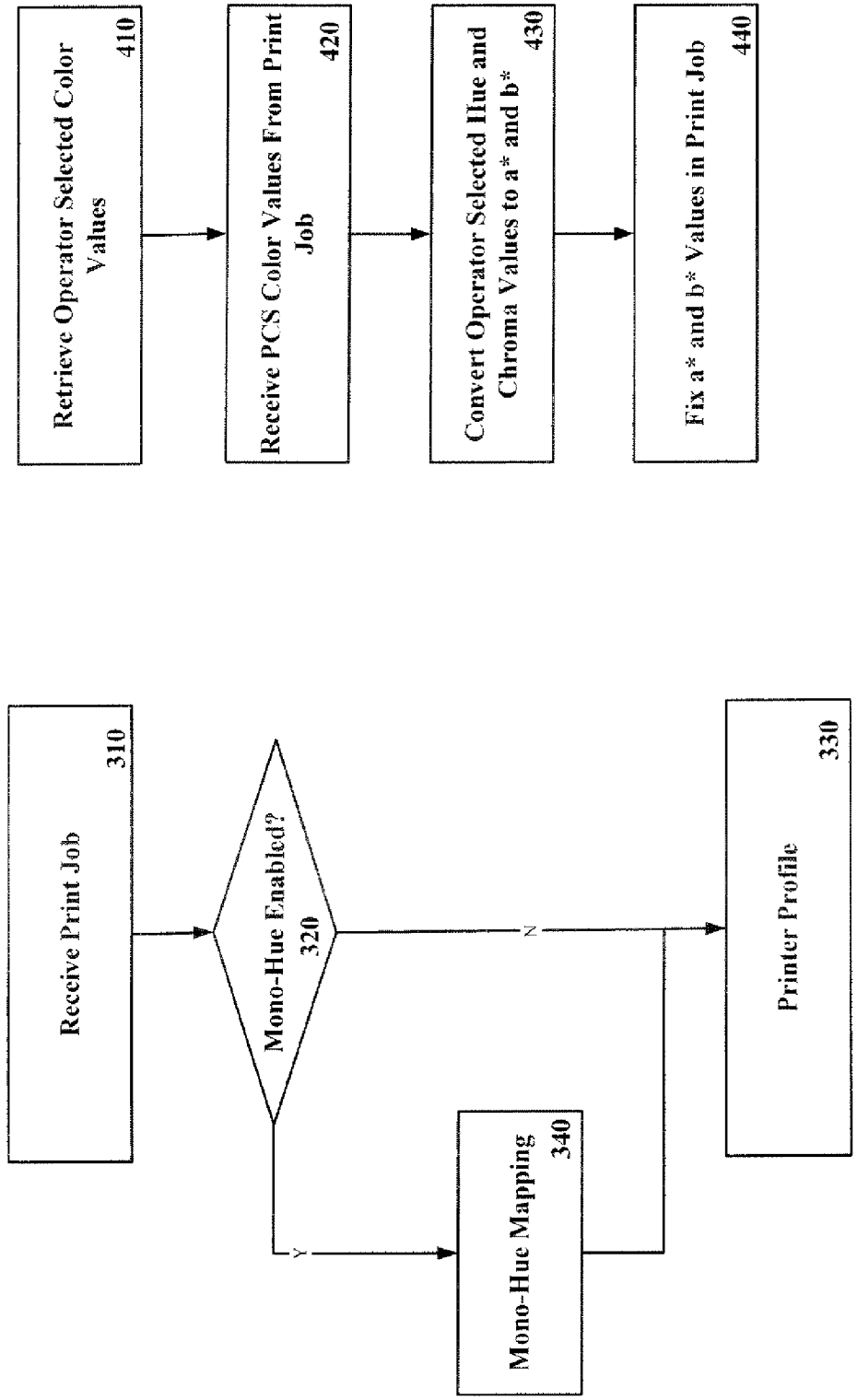
FIG. 3 is a flow diagram illustrating one embodiment for performing color conversion.
FIG. 4 is a flow diagram illustrating one embodiment for performing monochromatic hue mapping.

FIG. 3 is a flow diagram illustrating one embodiment for performing color conversion for each pixel in a print file. At processing block 310, a print job file is received at control unit 150. If the file is received as device input data, a conversion to PCS may be performed. Otherwise, it is determined whether color conversion mapping is enabled, decision block 320. In one embodiment, color conversion mapping may be enabled or disabled by the operator at GUI 170.

If conversion mapping is disabled, color management unit 210 performs color mapping to convert the color of each pixel of the received image to a corresponding printer 130 profile color based on the stored ICC profiles, processing block 330. However if conversion mapping is enabled, mono-hue mapping unit 220 performs the mapping, processing block 340.

FIG. 4 is a flow diagram illustrating one embodiment for performing monochromatic hue mapping. At processing block 410, mono-hue mapping unit 220 receives the print job color values. According to one embodiment, mono-hue mapping unit 220 receives lightness, chroma and hue values.

Lightness is a property of a color (or a dimension of a color space) that is defined in a way to reflect a subjective brightness perception of a color for humans along a lightness-darkness axis. Chroma is a perceived colorfulness in proportion to the brightness of a reference white patch, while hue is defined as a degree to which a stimulus can be described as similar to or different from stimuli that are described as red, green, blue, and yellow (e.g., the unique hues).

At processing block 420, mono-hue mapping unit 220 retrieves the operator selected color values. According to one embodiment, the operator selects lightness, hue and chroma values indicative of a desired color of printer output. However in another embodiment, the operator selects one of a multitude of tones (e.g., sepia) provided in GUI 170, and mono-hue mapping unit 220 generates hue and chroma values corresponding to the selected tone.

At processing block 430, mono-hue mapping unit 220 calculates color-opponent dimension (e.g. a* and b*) values corresponding to the selected hue and chroma values. At processing block 440, all pixel values in the print job are mapped to the calculated a* and b* values. Thus, the only change from pixel-to-pixel is the lightness value. Referring back to FIG. 3, control is returned to processing block 330 where color management unit 210 converts the hue mapped pixels to a corresponding printer 130 profile.

Figure 5:
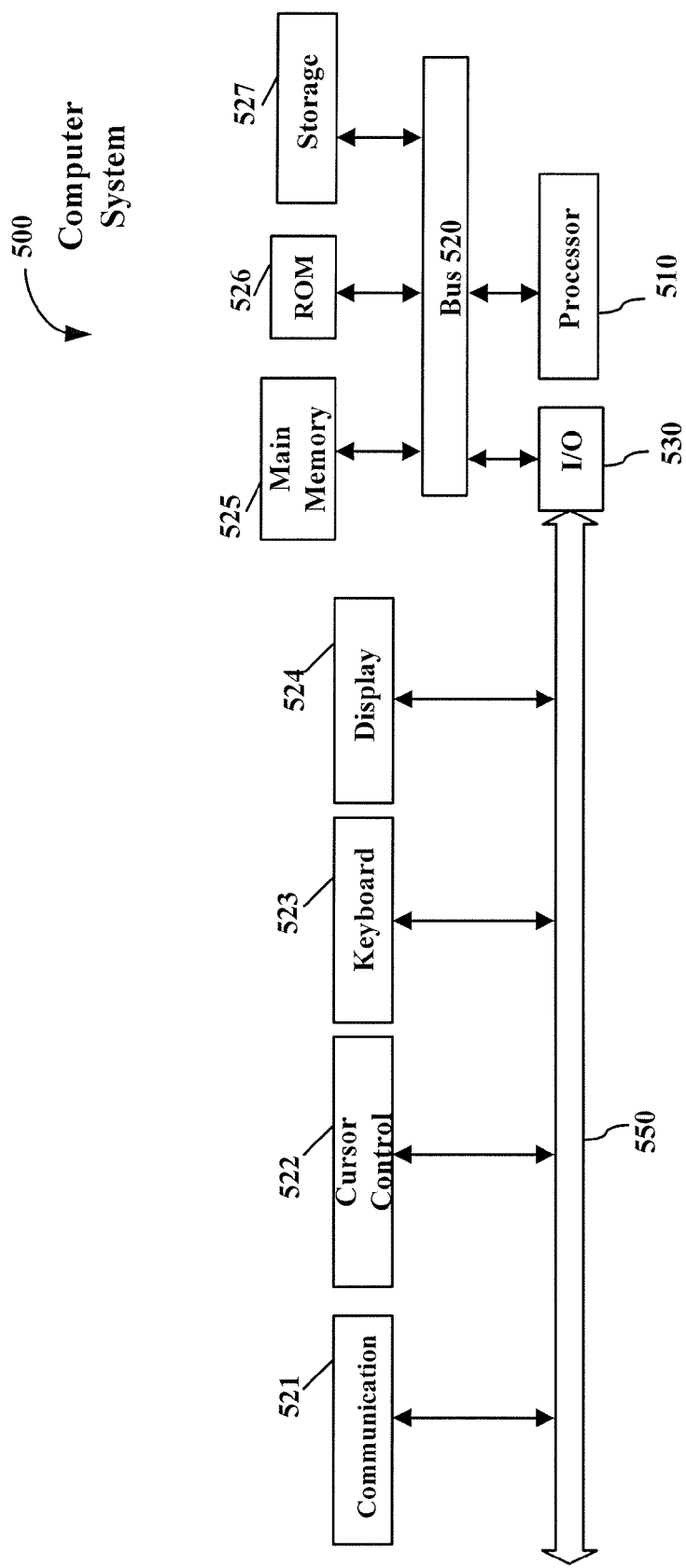
FIG. 5 illustrates one embodiment of a computer system.

FIG. 5 illustrates a computer system 500 on which server 130 may be implemented. Computer system 500 includes a system bus 520 for communicating information, and a processor 510 coupled to bus 520 for processing information.

Computer system 500 further comprises a random access memory (RAM) or other dynamic storage device 525 (referred to herein as main memory), coupled to bus 520 for storing information and instructions to be executed by processor 510. Main memory 525 also may be used for storing temporary variables or other intermediate information during execution of instructions by processor 510. Computer system 500 also may include a read only memory (ROM) and or other static storage device 526 coupled to bus 520 for storing static information and instructions used by processor 510.

A data storage device 525 such as a magnetic disk or optical disc and its corresponding drive may also be coupled to computer system 500 for storing information and instructions. Computer system 500 can also be coupled to a second I/O bus 550 via an I/O interface 530. A plurality of I/O devices may be coupled to I/O bus 550, including a display device 524, an input device (e.g., an alphanumeric input device 523 and or a cursor control device 522). The communication device 521 is for accessing other computers (servers or clients). The communication device 521 may include a modem, a network interface card, or other well-known interface device, such as those used for coupling to Ethernet, token ring, or other types of networks.

The above-described mechanism combines a user's desired hue with an output ICC profile to automatically map all incoming colors to the hue specified by the user. By using the ICC workflow and manipulating the output ICC profile, specific design features that were used to create the ICC profile (e.g., including ink or toner limits and ink saving optimizations) can be maintained in addition to the ability to provide the same desired hue across different output ICC profiles.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A method comprising:
   receiving color pixel data for an object to be printed;
   receiving predefined color values;
   calculating color space coordinates corresponding to the predefined color values;
   performing monochromatic hue mapping to map each pixel to the calculated color space coordinate values; and
   color mapping the pixels from a source color space to a destination color space.

2. The method of claim 1 further comprising determining whether monochromatic hue mapping is enabled prior to retrieving predefined color values.

3. The method of claim 2 wherein color mapping the pixels is performed after receiving color pixel data if monochromatic hue mapping is disabled.

4. The method of claim 1 wherein receiving the predefined color values comprises receiving user selected color values via a graphical user interface (GUI).

5. The method of claim 4 wherein the selected color values are directly selected at the GUI.

6. The method of claim 4 wherein a color tone is selected at the GUI and corresponding color values are generated.

7. The method of claim 1 wherein the color space coordinates comprise the a* and b* coordinates in the CIELAB color space.

8. A printer comprising:
a control unit to receive color pixel data for an object to be printed, the control unit having:
a monochromatic hue unit to receive predefined color values, calculate color space coordinates corresponding to the predefined color values and perform monochromatic hue mapping to map each pixel to the calculated color space coordinate values; and
a color unit to perform color mapping and determine color values for each pixel in an object to be printed.

9. The printer of claim 8 further comprising a graphical user interface (GUI) to allow an operator to enable and disable the monochromatic hue unit.

10. The printer of claim 9 wherein the control unit determines whether monochromatic hue mapping is enabled.

11. The printer of claim 9 wherein the predefined color values are selected via the GUI.

12. The printer of claim 11 wherein the selected color values are directly selected at the GUI.

13. The printer of claim 11 wherein a color tone is selected at the GUI and the corresponding color values are generated at the monochromatic hue unit.

14. An article of manufacture comprising a non-transitory machine-readable medium including data that, when accessed by a machine, cause the machine to perform operations comprising:

receiving color pixel data for an object to be printed;
receiving predefined color values;
calculating color space coordinates corresponding to the predefined color values;
performing monochromatic hue mapping to map each pixel to the calculated color space coordinate values; and
color mapping the pixels from a source color space to a destination color space.

15. The article of manufacture of claim 14 including data that further cause the machine to perform operations comprising determining whether monochromatic hue mapping is enabled prior to retrieving predefined color values.

16. The article of manufacture of claim 15 wherein color mapping the pixels is performed after receiving color pixel data if monochromatic hue mapping is disabled.

17. The article of manufacture of claim 14 wherein receiving the predefined color values comprises receiving user selected color values via a graphical user interface (GUI).

18. The article of manufacture of claim 17 wherein the selected color values are directly selected at the GUI.

19. The article of manufacture of claim 17 wherein a color tone is selected at the GUI and corresponding color values are generated.

20. The article of manufacture of claim 14 wherein the color space coordinates comprise the a* and b* coordinates in the CIELAB color space.

\* \* \* \* \*